Jan. 15, 1929. 1,698,969
J. D. SARTAKOFF
LIQUID LEVEL INDICATOR
Filed Oct. 25, 1923 2 Sheets-Sheet 2
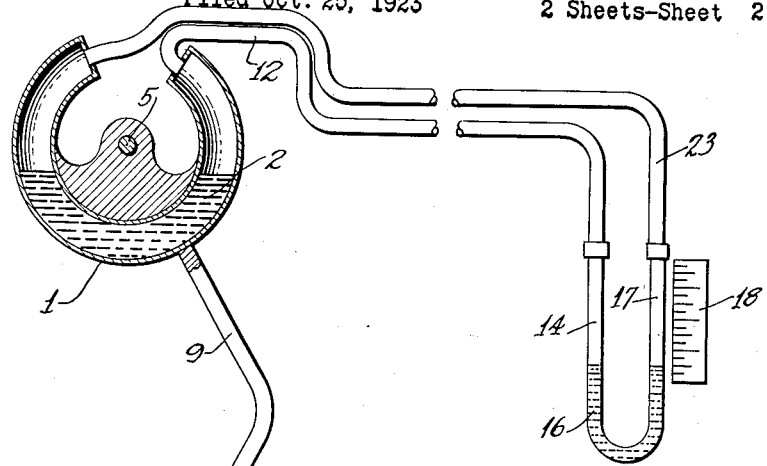
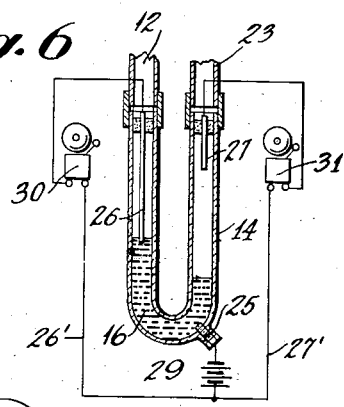
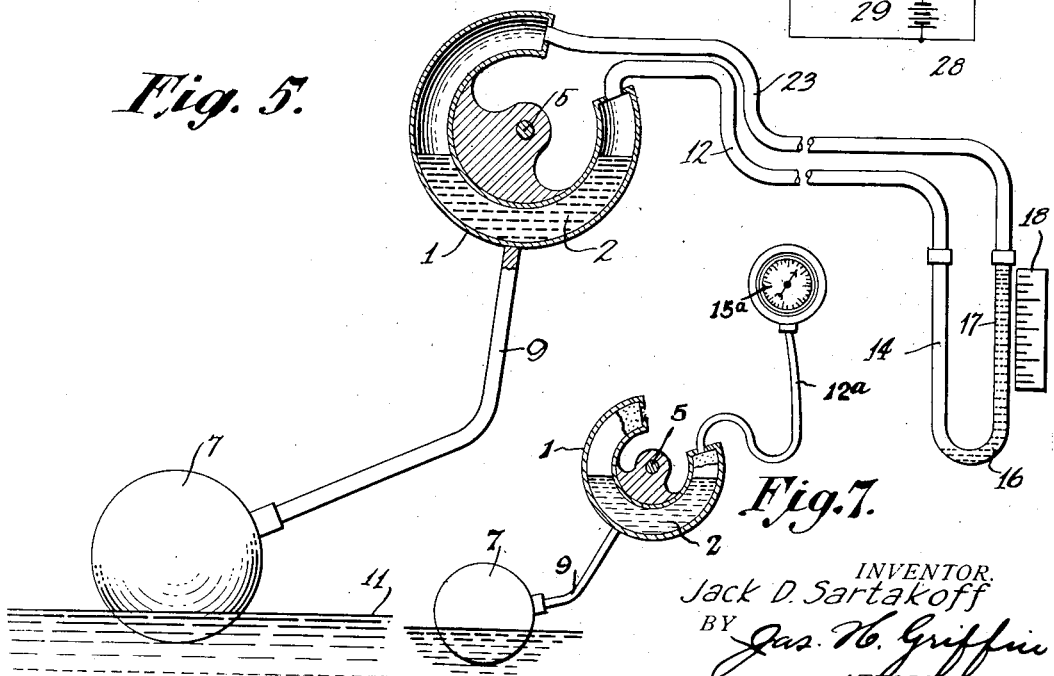
INVENTOR.
Jack D. Sartakoff
BY
Jas. H. Griffin
ATTORNEYS.

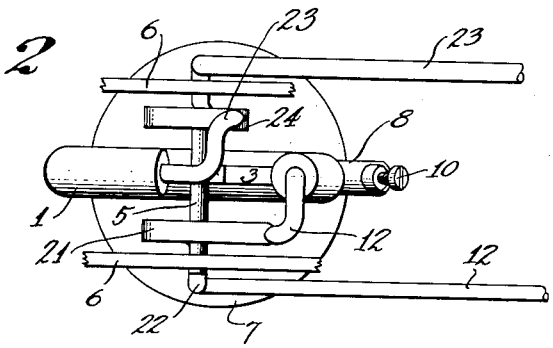
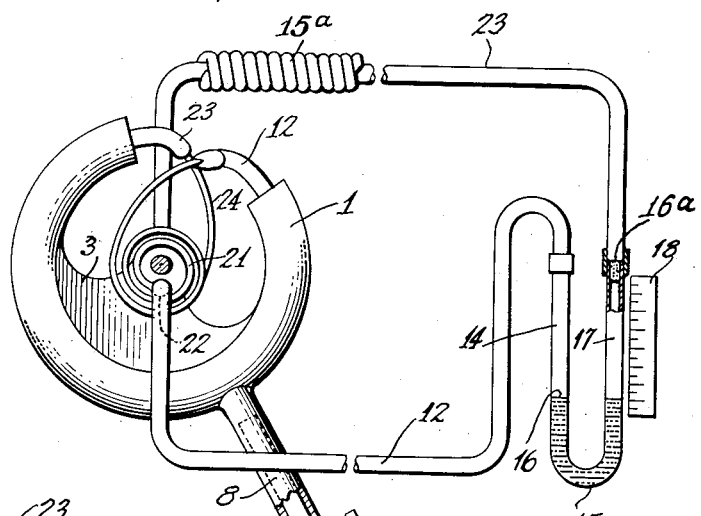
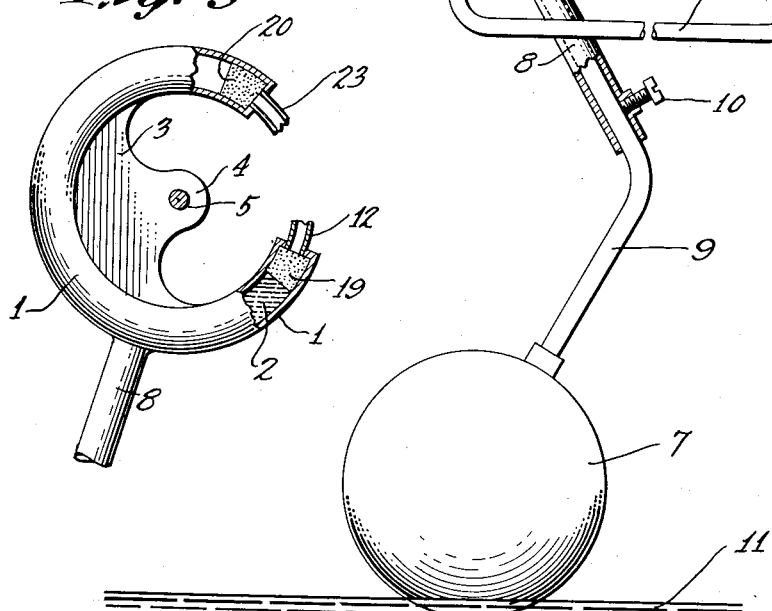

Patented Jan. 15, 1929.

1,698,969

UNITED STATES PATENT OFFICE.

JACK D. SARTAKOFF, OF NEW YORK, N. Y., ASSIGNOR, BY DIRECT AND MESNE ASSIGNMENTS, OF ONE-HALF TO J. D. SARTAKOFF CORPORATION, OF NEW YORK, N. Y., A CORPORATION OF NEW YORK, AND ONE-HALF TO KHETAH CORPORATION, OF NEW YORK, N. Y., A CORPORATION OF NEW YORK.

LIQUID-LEVEL INDICATOR.

Application filed October 25, 1923. Serial No. 670,704.

This invention is a liquid level indicator and relates more especially to means whereby an indication of a liquid level is automatically given at a place more or less distant from the location of the liquid. The invention is adapted for a wide variety of uses where accurate indication is desirable. In fact, the indicator of this invention may be operated as a precision instrument since the indications given will be perfectly accurate.

As exemplary of the many uses of which it is capable, reference may be made to its use as a level indicator for the fuel supply of a motor vehicle in which event the prime mover of the device may be positioned in the main fuel supply tank of the vehicle, while the indicating element may be positioned upon the instrument board or dash, these two parts being connected by tubing, whereby the operation of the prime mover may exert a variable pressure upon the indicating element for the purpose of obtaining accurate indications of the level of the liquid in the tank.

In accordance with this invention, the pressure referred to may be either pneumatic or hydraulic, but I prefer to use pneumatic pressure in this connection, since it is thoroughly satisfactory and more readily handled.

The most common type of device now in use as a fuel indicator for motor vehicles is that wherein a float operated lever is connected to an indicator on the instrument board by means of steel wire housed within a tube which serves as a casing for the wire and precludes the bending thereof. The float operates the lever and places a wire either under tension or compression to draw the wire in the direction of the lever or to force it in the opposite direction in order that the indicator may be operated in accordance with the operations of the float. Experience has proven however that after a relatively short time, corrosion within the tube like casing will cause the wire to freeze in position so that the device will no longer operate. The present invention has no moving mechanical parts between the prime moving elements and the indicating element but merely one or more conduits through which pressure is conveyed to the indicating element. The present device is therefore thoroughly reliable in its operations and will not deteriorate through long continued use.

Speaking generally, the invention embodies a liquid piston operable within a cylinder and the operations of which piston are controlled by a float which tilts the cylinder in accordance with the liquid level with which the float cooperates in order that the liquid piston may be lifted longitudinally of the cylinder to vary the pressures at the opposite ends thereof. If both ends of the cylinder are sealed it will be apparent that when the cylinder is tilted in one direction, the liquid piston will compress air in one end of the cylinder while if the cylinder is tilted in the opposite direction, air will be compressed in the opposite end of the cylinder.

In the preferred form of the invention, the two ends of the cylinders are connected by two tubes to the two ends of a U tube preferably of glass and in this U tube is positioned an indicating liquid such for example as mercury, glycerine, or other suitable readily visible indicating medium and associated with the U tube is a scale to facilitate the reading of the position of the indicating column.

With this arrangement, it will be apparent that when the liquid level rises the float will be lifted and will tilt the cylinder in one direction to compress air in one end of the cylinder. The pressure thus produced is conveyed through the associated line of tubing to one arm of the U tube with the result that the equilibrium of the indicating column is disturbed and the column elevated in the other leg of the U tube to a height corresponding to the rise in level of the liquid which is operating the float. As the liquid level falls, the cylinder is tilted in the opposite direction and causes the liquid piston to move in a corresponding direction thereby relieving the pressure previously set up and permitting the indicating column to recede.

In practice, only one end of the cylinder need be connected to the indicating element or U tube in order to give fairly accurate readings, but if both ends of the cylinder are connected to the two arms of the U tube corresponding plus and minus pressures will be applied simultaneously to the two arms of the U tube during each operation of the piston so that when pressure is applied against one end of the indicating column suction will be applied to the other end thereof. When this double tubing arrangement is employed, the device becomes a precision instrument and will give indications which are absolutely correct and will not vary in the slightest.

In the preferred embodiment of the invention, the pressure medium is pneumatic although I wish it understood that liquid pressure may be employed.

Features of the invention, other than those specified, will be apparent from the following detailed description and claims, when read in conjunction with the accompanying drawings.

The accompanying drawings illustrate different practical embodiments of the invention but the constructions therein shown are to be understood as illustrative, only, and not as defining the limits of the invention.

Figure 1 is a side elevation of indicating means embodying the present invention.

Figure 2 is a plan view of a part of the construction shown in Figure 1.

Figure 3 is an elevation partly in section of the tiltable cylinder in which the liquid piston is operable, a part of the cylinder being broken away to show the cylinder in section.

Figures 4 and 5 are diagrammatic views illustrating the operation of the device; and, Figure 6 shows a modified form of indicating element.

Figure 7 is a diagrammatic showing of a modified form of the invention.

Referring to the drawings 1 designates a cylinder which, in practice, may partake of various forms and shapes but I have found that a very satisfactory form is as illustrated in Figure 3, wherein the cylinder is shown as curved longitudinally upon the arc of a circle and embodying substantially three quarters of a complete circle. The cylinder is hollow and is made from any suitable material. Within the cylinder is a mobile piston 2 and in practice I find it convenient to utilize mercury or quicksilver as the material for the piston.

The cylinder is supported on a web 3 having a hub 4 journalled for rotation on a spindle 5. The spindle is mounted on a horizontal axis in fixed supports 6 of any suitable kind so long as they provide a support for the cylinder to oscillate upon a horizontal axis.

Rigidly associated with the cylinder 1 is a float 7 and a convenient manner of associating these parts is to form a shank 8 on the cylinder and to make this shank hollow so that the stem 9 of the float may extend into the shank and be locked in proper adjustment by means of a set screw 10. This arrangement permits of the adjustment of the float in order that the device may be properly regulated to give accurate indications of the level of the liquid 11. The liquid may be contained in any suitable tank, vessel or receptacle or may form part of a natural body of water, oil, or other liquid.

The cylinder however is so positioned with relation to the liquid 11 that when mounted for oscillation upon the fixed horizontal axis as described, the float will be under the influence of the liquid level and will rise and fall therewith. As the float rises or descends, it will manifestly cause a shifting of the piston within the cylinder and if the opposite ends of the cylinder are closed, this shifting of the piston will produce varying pressures corresponding to the direction of movement of the piston.

If therefore one end of the cylinder is connected by a tube 12 to one leg 14 of a U tube 15 containing liquid 16, it will be apparent that if the float rises from the low position shown in Figure 4 to the higher elevation shown in Figure 5, the cylinder will be rotated about its fixed axis in a clockwise direction while the mobile piston will be maintained by gravity in a stationary and balanced position, but during this operation the end of the cylinder to which the tube is connected will move toward the adjacent end of the piston and through this operation the air between the piston and the tube will be compressed and this rise in pressure will be communicated through the tube 12 to the leg 14 of the U tube with the result that the equilibrium of the indicating liquid 16 will be disturbed and the liquid caused to rise in the leg 17 of the U tube.

By placing a properly graduated scale 18 adjacent the leg 17 of the U tube, the rise and fall of the liquid 11 may be clearly indicated. It will of course be understood that the scale should be graduated in accordance with the remaining parts of the device and when so graduated the indication even with a single tube such as 12 will be fairly accurate. It will be manifest moreover that when the level of the liquid 11 recedes the float will descend and in so doing will relieve the pressure on the column of indicating liquid and permit it to recede with the liquid level.

The connections between the U tube and the cylinder should manifestly be tight in order to preclude leakage of pressure and when this is the case the indication will remain constant so long as the liquid level remains constant. In order to preclude spilling of the mercury or other liquid employed as the mobile piston, the opposite ends of the cylinder are preferably provided with porous plugs 19 and 20. These plugs may be of any suitable material sufficiently dense to preclude the passage of the material 2 therethrough, but sufficiently porous to permit air to pass therethrough. In the constructions thus far described, the plug 20 will function as a vent in order that a partial vacuum or superatmospheric pressure will not be produced between the plug 20 and the adjacent end of the mercury piston.

In practice, I may use pottery plugs which have been found to give very satisfactory results. I may also plug the upper ends of the legs of the U tube in order to preclude spilling of the indicating liquid 16. None of these plugs 16a however will preclude the passage of air and will therefore in nowise influence the indication except possibly to slightly slow down the movements of the indicating column when registering a rapid rise and fall in level of the liquid 11.

In the construction as shown in Figures 4 and 5, the tube 12 may be of rubber or any other suitable material which will permit the free oscillation of the cylinder under the impulse of the float. In Figures 1 and 2, however, I have illustrated the tube 12 as of metal and have incorporated intermediate its ends a spiral metallic section 21. One end of the spiral communicates with the tube section adjacent the end of the cylinder which houses the plug 19, while the other end of the spiral extends laterally as indicated at 22 in Figures 1 and 2 and continues as the remaining section of the tube 12 to the leg 14 of the U tube.

By employing the metallic spiral 21 as shown and incorporating it in the tube 12, this spiral will be resilient and will permit of oscillation of the cylinder without placing an appreciable load thereon in either direction. When employing the construction of the single tube 12 as described I may if desired use an indicating element other than a U tube with an indicating column and the invention is to be understood as not restricted to the use of a U tube. A suitable pressure indicator with a proper scale might be employed in lieu thereof.

This arrangement I have shown in Figure 7 of the drawing wherein 15a designates a suitable pressure indicator of any conventional form and 12a the tube by which the indicator is operated.

While a single tubular connection may be utilized between the cylinder and the indicating element, I prefer to employ a double tube connection therebetween. That is to say, I prefer to connect both ends of the cylinder to the U tube. Thus, as shown in the drawings, the end of the cylinder which houses the plug 20 is connected by a tube 23 to the upper end of the leg 17 of the U tube and in the construction as shown in Figures 1 and 2, a spiral section 24 is incorporated in this tube in the same manner as the spiral section 21 is incorporated in the tube 12 except that these two spirals are preferably coiled in opposite directions as shown in Figure 1, so that the inherent resiliency of both spiral sections will balance each other and maintain the cylinder in equilibrium at all times in so far as the action of the spiral sections are concerned. This will relieve the cylinder of any slight load which would be imposed upon it through the use of a single spiral section. The employment of a double tube however has a far more important advantage, since it will be apparent that when the second tube 23 is used, the movement of the mercury piston in a direction to place the liquid in the leg 14 under pressure will simultaneously result in the production of a corresponding partial vacuum in the leg 17 of the tube, so that the indicating column will be, when the cylinder starts to oscillate, simultaneously placed under plus and minus pressures, cooperating to move the mercury column into a position wherein these pressures will be balanced and as soon as the column is moved into this balanced position, the conditions of pressure will be substantially balanced and the mercury column will remain stationary until the cylinder is again moved.

When two tubes are employed as described, the movement of the indicating column will have a positive relation to the movement of the float and the indications will as a result be absolutely accurate.

In the event that the two tubes 12 and 23 are both employed, I find in practice that it is desirable to position them side by side for the greater portion of their length and I preferably use them within a suitable casing. For example, in employing the device as an indicator for the fuel level in an automobile tank, the tubes may be led through a casing of BX cable 15a from the tank into close proximity with the U tube. The advantage of this is that if pneumatic pressure is depended upon, changes in temperature may influence the indication. For example, if the pipe 12 passes in close proximity to the motor and the pipe 23 were more remote therefrom, it is possible that the air in the pipe 12 may be heated to such extent as to expand appreciably and cause an incorrect reading. By passing both tubes through a common conduit however any heat which affects one tube will similarly affect the other and the indication will remain correct.

I prefer in practice to control the indicator pneumatically from the cylinder, but I do not wish to be understood as limiting this invention to a pneumatic control, since the tubes may if desired be filled with a liquid. For example, I may use a mercury piston 2 and a mercury column 16 and may fill the remainder of the system with glycerine or some other suitable liquid so that the mercury column 16 will be operated hydraulically from the mobile piston 2. For the great majority of uses, a U tube pneumatically operated will give highly satisfactory results and will moreover give all the indication desired. I may however associate with the U tube suitable alarm means to indicate when maximum and minimum liquid levels are present.

One manner in which this may be accomplished is shown in Figure 6, wherein the U tube is provided with an electrical connection 25 at its base and electrical connections 26 and 27 depending from the plugs at the tops of the legs of the U tube. A single wire 28 leads from the connection 25 through a battery or other source of electrical energy 29 and from the opposite side of the battery wires 26' and 27' lead through electric bells 30 and 31, respectively, to the connections 26 and 27. The connection 26 depends sufficiently far into the leg 14 so that when the minimum liquid level is reached, the indicating column will complete a circuit between the connections 25 and 26 and the connection 27 depends to such distance that when the predetermined maximum level is reached, the indicating column will close the circuit between the connections 25 and 27. When either one of these circuits is closed the corresponding bell will ring thereby calling attention to this fact.

Such a system as shown in Figure 6 would not be necessary in connection with the use of the device on automobiles, but is highly desirable when the device is used in other connections such for example as indicating the level of water in mine shafts, tunnels, etc., or in connection with dams and locks, or in connection with the water level in steam boilers where serious damage may occur if the level becomes too high or too low.

It may be here stated that the controlling of the indicator through the employment of pressure may be accurately carried on for relatively long distances where electricity has heretofore been depended upon for transmitting signals. The use of pressure communicated through metallic piping properly installed is far more dependable than electricity because of the arcing which damages contacts and the failure of current supplies to properly function in the event of emergency.

For these reasons, I wish it clearly understood that the invention is not restricted to use in any particular field and that on the contrary it is adapted for general application and may be of any suitable size and dimensions appropriate to the particular environment in which it is employed.

An important feature of the invention resides in the fact that in the embodiment of the invention as shown in the drawings the only parts where any friction might result is incident to the pivoting of the cylinder. If proper pivots are provided the device cannot fail to operate as frequently occurs in practically all prior indicators due to the accumulation of corrosion in the numerous working parts thereof.

I wish to further emphasize the fact that the particular shaping of the cylinder shown in the drawings while that preferred is not the only shaping that can be availed of. In this connection, the invention contemplates, generally speaking, the utilization of a mobile piston housed within a passage which I have termed a cylinder and which cylinder is adapted to be oscillated to shift the opposite ends of the cylinder toward and away from the respective ends of the pistons to effect the pressure changes which have been described.

Any construction which will operate in this manner is a matter of detail when the invention is once understood. The invention is therefore to be considered as fully commensurate with the appended claims.

Having thus fully described the invention, what I claim as new and desire to secure by Letters Patent is:

1. In a liquid level indicating system, a pressure responsive indicating device, a cylinder mounted to oscillate on a substantially horizontal axis and shaped so that its opposite ends extend upwardly above the intermediate portion of the cylinder, a body of liquid within the cylinder and forming a liquid seal intermediate the ends of the cylinder to divide the interior of the cylinder into two separate chambers positioned above the surface of the liquid, and sealed with respect to one another by said body of liquid, the pivot axis being so located with reference to the cylinder that when the cylinder is oscillated, the volumes of said chambers are varied inversely with respect to one another, a conduit connecting one of said chambers to the indicating device, the conduit and its associated chamber having therein a medium through which conduit variable pressures in said chamber are communicated to the indicating device, the chamber to which the conduit is connected being sealed except for the conduit, and a float connected to the cylinder and adapted to oscillate it.

2. In a liquid level indicating system, a differential pressure responsive indicating device, a cylinder mounted to oscillate on a substantially horizontal axis and shaped so that its opposite ends extend upwardly above the intermediate portion of the cylinder, a body of liquid within the cylinder and forming a liquid seal intermediate the ends of the cylinder to divide the interior of the cylinder into two separate closed chambers positioned above the surface of the liquid, and sealed with respect to one another by said body of liquid, the pivot axis being so located with reference to the cylinder that when the cylinder is oscillated, the volumes of said chambers are varied inversely with respect to one another, a float connected to the cylinder to oscillate it, and tubes respectively leading from the chambers to the pressure indicating device, the chambers and tubes having therein a pressure transmitting medium, whereby the variable differential of the pressures within both chambers is simultaneously communicated through the tubes to the indicating device.

3. In a liquid level indicating system, an indicating element embodying a U tube having an indicating liquid therein, in combination with a cylinder mounted to oscillate on a substantially horizontal axis and shaped so that its opposite ends extend upwardly above the intermediate portion of the cylinder, a body of liquid within the cylinder and forming a liquid seal intermediate the ends of the cylinder to divide the cylinder into two separate closed chambers positioned above the surface of the liquid and sealed with respect to one another by said body of liquid, the pivot axis being so located with reference to the cylinder that when the cylinder is oscillated, the volumes of said chambers are varied inversely with respect to one another, a float connected to the cylinder to oscillate it, a conduit leading from one of said chambers to one arm of the U tube, and a conduit leading from the other of said chambers to the other arm of the U tube, said chambers and conduits having therein a pressure transmitting medium.

4. A liquid level indicating system embodying a pressure responsive indicating element, a cylinder longitudinally bent to substantially U shape and mounted to oscillate on a substantially horizontal axis so located with reference to the cylinder that when the cylinder is tilted about said axis, the level of its ends will be relatively changed, said cylinder containing a mobile piston adapted to occupy, at all times, the lower portion of the cylinder and seal that portion of the length of the cylinder which is occupied by the piston, a conduit between at least one end of the cylinder and the indicating element, said end of the cylinder being sealed except for the conduit, and a float connected to the cylinder and adapted through the rise and fall of the float, to tilt the cylinder and cause the mobile piston to change position therein, the conduit and the associated end of the cylinder having therein a pressure transmitting medium whereby varying pressures are communicated through the conduit to the indicating element.

5. A liquid level indicating system embodying a cylinder curved longitudinally on the arc of a circle and pivoted for oscillation about the center of the arc, a liquid piston positioned within the cylinder and a float operatively connected to the cylinder for oscillating said cylinder in accordance with the rise and fall of an associated body of liquid, in combination with a pressure responsive indicator, a conduit connecting at least one end of the cylinder to the indicator, said end of the cylinder being sealed except for the conduit, and said conduit and the associated end of the cylinder having therein a pressure transmitting medium, whereby the oscillation of the cylinder will communicate varying pressures through the conduit for the purpose of operating the pressure responsive indicator.

6. A liquid level indicating system embodying a cylinder curved longitudinally on the arc of a circle and mounted for oscillation about the center of the arc, a liquid piston positioned within the cylinder and a float operatively connected to the cylinder for oscillating said cylinder in accordance with the rise and fall of an associated body of liquid, in combination with an indicating U tube having a liquid indicating column therein, and a conduit connection leading from one end of the tube to one end of the cylinder and said end of the cylinder being sealed except for the conduit, said conduit and the associated end of the cylinder having therein a pressure transmitting medium, whereby the oscillation of the cylinder will subject the corresponding end of the indicating column to varying pressures and cause the indicating column to partake of corresponding indicating positions in the tube.

7. A liquid level indicating system embodying a cylinder curved longitudinally on the arc of a circle and mounted for oscillation about the center of the arc, a liquid piston positioned within the cylinder, and a float operatively connected to the cylinder for oscillating said cylinder in accordance with the rise and fall of an associated body of liquid, in combination with a U tube having a liquid indicating column therein and conduits respectively connecting the ends of the U tube to the corresponding ends of the cylinder, both ends of the cylinder being sealed except for said associated conduits, and both conduits as well as the associated ends of the cylinders having therein a pressure transmitting medium, whereby the oscillation of the cylinder will simultaneously impose inversely varying pressures upon the opposite ends of the indicating column, to effect shifting of the column in the tube to positions corresponding to the levels of the body of liquid to be indicated.

In testimony whereof I have signed the foregoing specification.

JACK .D. SARTAKOFF.